United States Patent [19]

Russell et al.

[11] Patent Number: 4,714,403
[45] Date of Patent: Dec. 22, 1987

[54] DOWN-HOLE DEVICES FOR IMPARTING ROTARY MOTION

[75] Inventors: Michael K. Russell, Prestbury; Colin Arlott, Bredon, both of England

[73] Assignee: NL Industries, Inc., New York, N.Y.

[21] Appl. No.: 779,740

[22] Filed: Sep. 24, 1985

[30] Foreign Application Priority Data

Oct. 4, 1984 [GB] United Kingdom ............... 8425109

[51] Int. Cl.$^4$ ................................................ E21B 4/02
[52] U.S. Cl. .................................... 415/107; 415/185; 415/501
[58] Field of Search .................... 415/75, 92, 104–107, 415/111, 112, 185, 501, 502; 417/354, 424; 175/107

[56] References Cited

U.S. PATENT DOCUMENTS

| 1,878,747 | 9/1932 | Youngblood | 415/185 X |
| 2,592,519 | 4/1952 | Postlewaite | 415/107 |
| 2,800,296 | 7/1957 | Hatch et al. | 415/501 X |
| 4,245,473 | 1/1981 | Sandoval | 415/92 X |
| 4,265,323 | 5/1981 | Juergens | 415/502 X |

FOREIGN PATENT DOCUMENTS

| 2082653 | 3/1982 | United Kingdom . |
| 2087951 | 6/1982 | United Kingdom . |
| 2123458 | 7/1982 | United Kingdom . |
| 144438 | 10/1980 | U.S.S.R. ............................ 417/354 |

Primary Examiner—Robert E. Garrett
Assistant Examiner—Joseph M. Pitko
Attorney, Agent, or Firm—Browning, Bushman, Zamecki & Anderson

[57] ABSTRACT

A down-hole signal transmitter includes an annular impeller mounted on a cylindrical casing and arranged to be driven by the mud flow passing along a drill string, and an annular stator fixed to the casing upstream of the impeller. The stator has blades canted in one sense relative to the mud flow direction, whereas the impeller has blades parallel to the mud flow direction. The stator blades thereby cause the mud flow to impact on the impeller blades at such an angle that a small or negligible thrust results at the impeller bearings. It is therefore possible to insure a long service life for the bearings.

11 Claims, 6 Drawing Figures

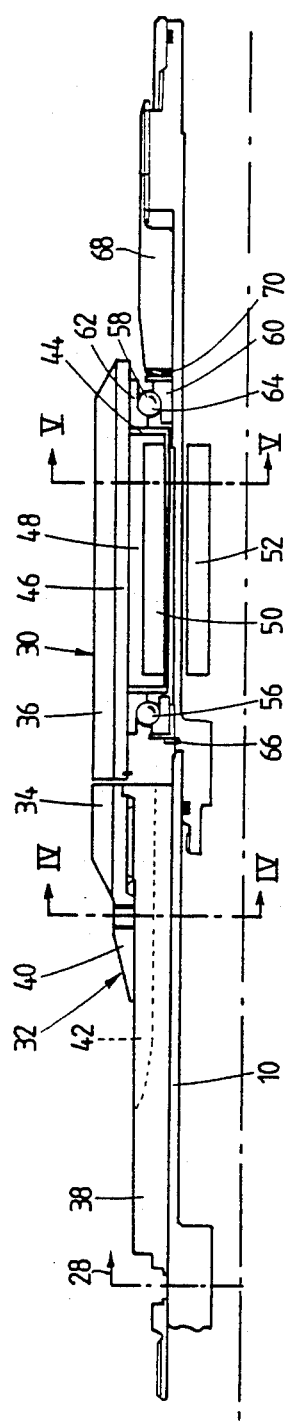
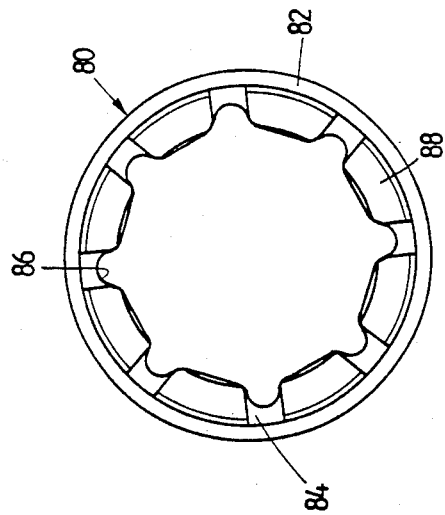
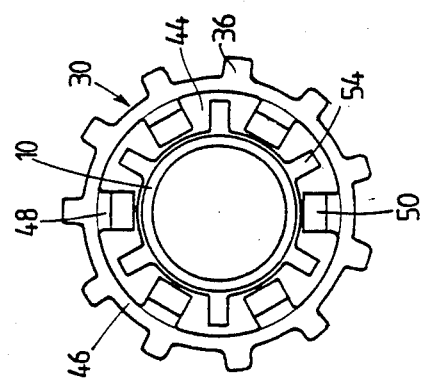
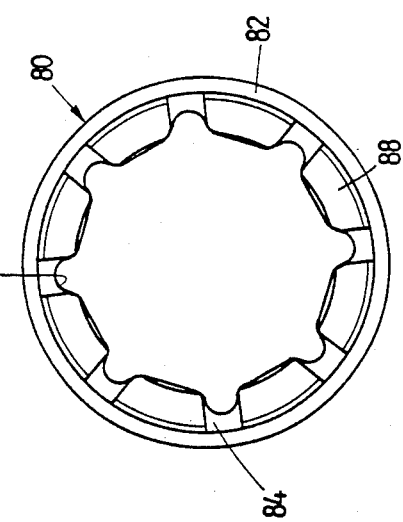

ial. the rea4,714,403

DOWN-HOLE DEVICES FOR IMPARTING ROTARY MOTION

BACKGROUND OF THE INVENTION

This invention relates to down-hole devices for imparting rotary motion, and is more particularly concerned with devices for converting the kinetic energy of the mud flow passing along a drill string into rotary motion for driving a generator or a measuring or signalling instrument (hereinafter referred to as devices "of the type defined").

Because of space limitations down-hole for the accommodation of batteries, and so as to avoid the problems associated with the need for frequent battery replacement, there are many circumstances in which it is desirable for electrical power to be generated down-hole by a turbogenerator driven by the mud flow or for mechanical energy required for a moving part down-hole to be generated directly by an impeller driven by the mud flow. Devices for performing these functions down-hole are known. For example, the applicant's British Patent Specifications Nos. 2,082,653A and 2,087,951A disclose an arrangement in which a mud-driven impeller drives both an electrical generator and a linearly-displaceable throttling member for generating pressure pulses in the mud flow with the object of transmitting measurement data to the surface.

However, such known devices require the use of impeller bearings which are capable of accommodating a substantial thrust due to the mud flow acting on the impeller, and it is difficult to produce suitable bearings which have a long service life. It is particularly important that devices which operate down-hole should not require frequent repair or replacement as such repair or replacement can be very costly in terms of lost drilling time. Furthermore it can be difficult to ensure a long service life for a down-hole device in view of the hostile conditions down-hole and the abrasive nature of the mud.

It is an object of the invention to provide a device of the type defined which is capable of a long service life down-hole.

SUMMARY OF THE INVENTION

According to the invention there is provided a down-hole device of the type defined comprising a rotary drive member arranged to have its rotational axis disposed along the axis of the drill string, an annular bladed impeller arranged to be driven by the mud flow and coaxial with the drive member to which it is coupled to impart driving torque thereto, an annular impeller bearing, and a bladed stator arranged immediately upstream of the impeller so as to act on the mud flow before it reaches the impeller, the blades of the stator being canted relative to the mud flow to cause the mud flow to impact on the blades of the impeller at such an angle that a small or negligible thrust results at the impeller bearing.

With such a device the thrust exerted on the bearing would be much less than would be the case under similar conditions with the arrangement disclosed in Specifications Nos. 2,082,653A and 2,087,951A referred to above. It is therefore relatively easy to provide a bearing for the device of the invention which is capable of a long service life.

In a preferred embodiment of the invention, the stator blades are canted in one sense relative to the mud flow, preferably at an angle in the range from 10° to 15°, and the impeller blades are substantially parallel to the mud flow or are canted in said one sense relative to the mud flow.

The rotary drive member will generally be coupled to an electrical generator, so that the kinetic energy of the mud flow is used to produce electrical power for use down-hole. It is found that the device is easily capable of supplying the power requirements of a signal transmitter for a mud pulse telemetry system and an associated measuring instrument, even though the efficiency of energy transfer of such a device would generally not be as high as that of the known device previously referred to.

The invention is particularly advantageous where the stator and the impeller surround a casing which contains the drive member in a mud-free environment, the stator being fixed in relation to the casing and the impeller being rotatable on the casing by way of the bearing. In this case the magnitude of the bearing surface is limited by the outside diameter of the casing on the one hand the inside diameter of the duct for the mud flow on the other hand, so that it is important that the thrust which must be accommodated by the bearing surface is as small as practicable. In order to avoid having to provide a rotating seal the impeller may be magnetically coupled to the drive member in order to impart driving torque thereto.

The impeller bearing may be of a type which is intended to be lubricated by the mud flow, in which case flow passages are preferably provided in the stator for supplying mud to the bearing. The bearing may comprise upper and lower bearing parts acting in opposite directions, and each bearing part may be in the form of an angular contact bearing.

BRIEF DESCRIPTION OF THE DRAWINGS

In order that the invention may be more fully understood, a preferred form of device in accordance with the invention will now be described, by way of example, with reference to the accompanying drawings, in which:

FIG. 3 is an axial section through the impeller and stator on one side of the casing;

FIGS. 4 and 5 are cross-sections taken through the casing along the lines IV—IV and V—V respectively in FIG. 3; and FIG. 6 is an end view of an alternative form of bearing which may be used in the device.

DETAILED DESCRIPTION OF THE DRAWINGS

Figure 1:
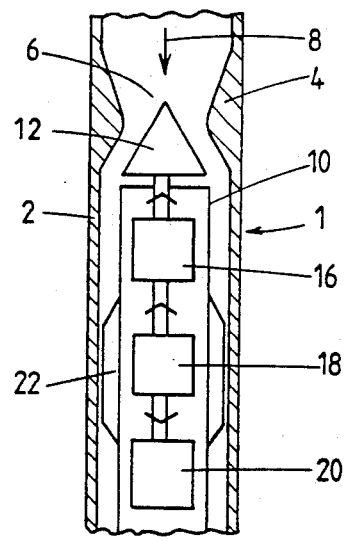
FIG. 1 is a diagram of a per se known downhole signal transmitter with which the device of the invention may be used.

The per se known signal transmitter 1 illustrated in FIG. 1 is installed within a drill collar disposed at the end of a drill string within a borehole during drilling. The signal transmitter 1 serves to transmit measurement data to the surface, in the form of pressure pulses, by modulating the pressure of the mud which passes down the drill string.

The transmitter 1 includes a duct 2 provided at its upper end with an annular flow constrictor 4 defining a throttle orifice 6 for the mud flow passing down the drill string in the direction of the arrow 8. Within the duct 2 is an elongate casing 10 bearing at its upper end, in the vicinity of the throttle orifice 6, a throttling member 12 which is displaceable with respect to the casing 10 to vary the throughflow cross-section of the throttle orifice 6. An annular impeller 22 surrounds the casing 10 and is rotatable in the mud flow. The impeller 22 is magnetically coupled to a drive member 18 within the casing so as to drive the drive member 18 which in turn drives both a pump 16 and an electrical generator 20 for supplying electrical power down-hole. The pump 16 is provided to linearly displace the throttling member 12, the direction of displacement of the throttling member 12 being determined by a solenoid actuator (not shown) under control of an electrical input signal.

The detailed structure and operation of such a signal transmitter may be determined by reference to the applicant's British Patent Specification No. 2,123,458A, the contents of which are introduced herein by reference.

Figure 2:
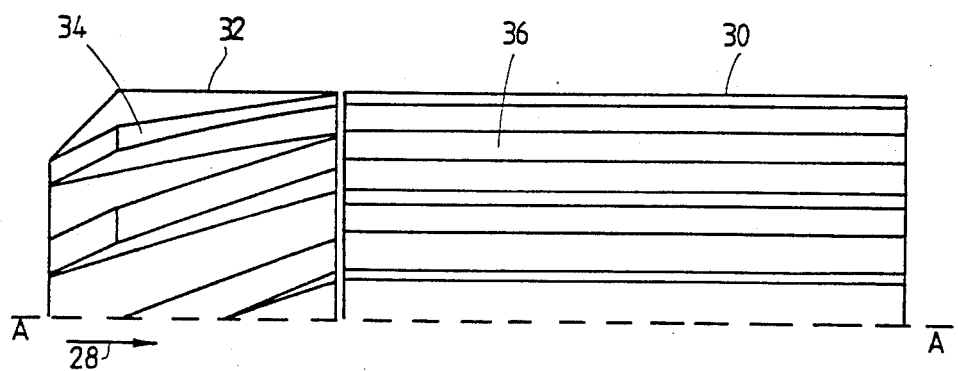
FIG. 2 is a side view of that part of the impeller and stator of the device of the invention on one side of a line A—A, it being understood that the impeller and stator in fact extend symmetrically on either side of the line A—A.

In the form of the device in accordance with the present invention which will now be described with reference to FIGS. 2 to 5 of the drawings, the impeller shown in the drawings of Specification No. 2,123,458A is replaced by the annular impeller 30 and annular stator 32 partially shown in FIG. 2. The stator 32 has blades 34 canted in one sense relative to the mud flow direction 28, whereas the impeller 30 has blades 36 parallel to the mud flow direction 28. In a variation the impeller blades 36 are also canted in said one sense relative to the mud flow direction 28. The casing 10 is not shown in FIG. 2, although it will be appreciated that both the impeller 30 and the stator 32 surround the casing 10.

Referring to FIGS. 3 to 5, the stator 32 comprises a collar 38 fixed to the casing 10 and a blade-bearing ring 40 screwed on to the collar 38. The collar 38 is provided with three longitudinal slots 42 in its outer surface, the slots 42 being equiangularly distributed about the circumference of the collar 38. As shown by a broken line in FIG. 3, each slot 42 has an inlet opening at the outside surface of the collar 38 and an outlet opening adjacent the impeller 30.

The impeller 30 comprises a magnet-bearing ring 44 surrounding the casing 10, and a blade-bearing ring 46 surrounding the ring 44 and fixed thereto. The ring 44 bears six longitudinal slots 48 in its outside surface, the slots 48 being equiangularly distributed about the periphery of the ring 44. Each slot 48 contains a respective rare earth magnet 50, preferably a samarium-cobalt magnet. Three of the magnets 50 have their North poles facing radially outwardly and a further three of the magnets 50, alternating with the previous three magnets, have their South poles facing radially outwardly. These impeller magnets 50 co-operate with six further rare earth magnets 52 equiangularly distributed within the casing and with their poles orientated in a similar arrangement to the magnets 50. In this way drive torque is transferred from the impeller to a driven shaft within the casing 10 bearing the magnets 52 with the sets of magnets 50 and 52 being locked together magnetically at a defined relative orientation. The magnet-bearing ring 44 also has a series of longitudinal slots 54 in its inside surface which open respectively at opposite end surfaces of the ring 44.

The impeller 30 is rotatably mounted with respect to the casing 10 by means of upper and lower annular contact bearings 56 and 58. Each bearing 56 or 58 comprises a bearing race made of relatively soft, resiliently deformable material, for example rubber, and defined by a member 60 fixed to the casing 10 and a member 62 fixed to the impeller 30, and balls 64 made of a relatively hard material, for example steel. Alternatively the bearing races may be made of a relatively hard material and the balls may be made of a relatively soft material. However, it is preferable that either the races or the balls should be made of a relatively soft material as the bearings are intended to be lubricated by the mud flow, and the use of such a soft material will ensure that the bearings are worn less rapidly by the action of particles within the mud flow becoming trapped between the balls and the races.

The bearing members 60 are capable of limited sliding movement with respect to the casing 10, and the complete bearing assembly is held axially between a fixed stop 66 and a collar 68 screwed to the casing 10, a spring 70 being disposed between the collar 68 and the member 60 of the lower bearing 58 in order to allow for axial expansion in use.

In operation mud flowing downwardly in the annular space between the casing 10 and the outer duct (not shown in FIGS. 3 to 5), that is in the direction 28, impinges on the blades 34 of the stator 32 and is directed by these blades 34 so that the mud then impinges on the blades 36 of the impeller 30 at such an angle that there is a small or negligible thrust exerted axially of the impeller 30 due to the impact of the mud flow on the impeller blades 36. In other words substantially the whole of the thrust acts tangentially so as to impart rotational motion to the impeller 30. Thus a small or negligible thrust is transmitted to the bearings. If any component of thrust due to viscous drag is ignored, the thrust vector will be at rightangles to the impeller blades in which case the best result will be achieved with the impeller blades parallel to the axis of the casing 10. However, in practice, there will be some viscous drag, and it may be desirable to compensate for this by canting the impeller blades in the same sense as the stator blades so that the mud flow impinging on the impeller blades produces a thrust component vertically upwards which cancels out the thrust component due to viscous drag.

In view of the very small or negligible thrust experienced by the bearings in such an arrangement, the bearings may be of light construction and may be lubricated by the mud flow. Such lubrication is ensured by mud passing along the slots 42 in the stator collar 38, and by mud passing between the upper and lower bearings 56 and 58 by way of the slots 54 in the magnet-bearing ring 44 of the impeller 30.

In an alternative arrangement each bearing 56 or 58 is replaced by a bearing 80, as shown from one end in FIG. 6, which bears directly against a flat, annular bearing surface at a respective end of the impeller 30. The bearing 80, which is shown removed from the assembly in FIG. 6 in order that its construction may be appreciated more easily, comprises a metal sleeve 82 having a rubber layer 84 on its inside surface and eight equiangularly spaced axial grooves 86 for flow of lubricating mud from one end of the sleeve to the other. In addition eight rubber lands 88 are formed integrally with the layer 84 and are radially positioned so as to be directly offset relative to the grooves 86. The lands 88 extend axially from the end of the sleeve 82 to a level proud of the sleeve 82 where they form eight radially spaced bearing sufaces for bearing against the corresponding bearing surface on the impeller 30.

In another alternative arrangement the stator blades may be curved along their lengths so that the angle at which the blades are canted relative to the mud flow increases as the distance from the impeller decreases.

We claim:

1. A down-hole device for converting the kinetic energy of the mud flow passing along a drill string into rotary motion for driving a generator or a measuring or signalling instrument, the device comprising a rotary drive member arranged to have its rotational axis disposed along the axis of the drill string, an annular bladed impeller coaxial with the drive member to which it is operatively coupled to impart driving torque thereto and having a plurality of radially outwardly projecting blades distributed about the circumference thereof and arranged to be driven by the mud flow, an annular impeller bearing, and an annular bladed stator coaxial with the drive member and having a plurality of radially outwardly projecting blades distributed about the circumference thereof and arranged immediately upstream of the impeller so as to act on the mud flow before it reaches the impeller, the blades of the stator being canted relative to the mud flow and relative to the blades of the impeller to cause the mud flow to impact on the blades of the impeller at such an angle that a small or negligible thrust results at the impeller bearing due to the combined effect of the mud flow acting on all the blades of the impeller.

2. A device according to claim 1, wherein the stator blades are canted in one sense relative to the mud flow, and the impeller blades are canted in said one sense relative to the mud flow to a lesser degree than the stator blades.

3. A device according to claim 1, wherein the stator blades are canted in one sense relative to the mud flow, and the impeller blades are substantially parallel to the mud flow.

4. A device according to claim 2 or 3, wherein the stator blades are canted at least in their downstream portions at an angle in the range from 10° to 15° relative to the mud flow.

5. A device according to claim 1, wherein the stator blades are slightly curved along their lengths.

6. A device according to claim 5, wherein the impeller bearing includes at least one bearing surface made of resiliently deformable material.

7. A device according to claim 1, wherein the impeller bearing is of a type which is intended to be lubricated by the mud flow.

8. A device according to claim 1, wherein the impeller bearing comprises upper and lower bearing parts acting in opposite directions.

9. A device according to claim 8, wherein the impeller is magnetically coupled to the drive member in order to impart driving torque thereto.

10. A device according to claim 1, wherein the stator and the impeller surround a casing which contains the drive member in a mud-free environment, the stator being fixed in relation to the casing and the impeller being rotatable on the casing by way of the impeller bearing.

11. A device according to claim 1, wherein the drive member is coupled to an electrical generator to drive the generator.

* * * * *